(12) United States Patent
Baugh et al.

(10) Patent No.: US 9,952,613 B1
(45) Date of Patent: Apr. 24, 2018

(54) SYSTEM AND METHOD OF DATA REDUCTION FOR CELLULAR M2M TRANSMISSIONS FROM ENERGY MANAGEMENT SYSTEMS

(71) Applicant: EnTouch Controls, Inc., Richardson, TX (US)

(72) Inventors: Richard K. Baugh, Plano, TX (US); Kevin Nelson, Wylie, TX (US); Iftekhar Hasan, Richardson, TX (US)

(73) Assignee: Entouch Controls Inc., Richardson, TX (US)

( * ) Notice: Subject to any disclaimer, the term of this patent is extended or adjusted under 35 U.S.C. 154(b) by 369 days.

(21) Appl. No.: 14/668,302

(22) Filed: Mar. 25, 2015

(51) Int. Cl.
*H04W 74/00* (2009.01)
*G05F 1/66* (2006.01)
*H04L 29/06* (2006.01)
*G05B 15/02* (2006.01)

(52) U.S. Cl.
CPC .............. *G05F 1/66* (2013.01); *G05B 15/02* (2013.01); *H04L 63/1416* (2013.01); *H04L 63/1425* (2013.01); *H04L 69/04* (2013.01)

(58) Field of Classification Search
CPC ............. H04L 63/1416; H04L 63/1425; H04L 41/0681; G06F 2201/86; G06F 17/30699
See application file for complete search history.

(56) References Cited

U.S. PATENT DOCUMENTS

| | | | |
|---|---|---|---|
| 9,577,934 B2* | 2/2017 | Gross | H04L 47/10 |
| 2003/0074106 A1* | 4/2003 | Butler | G06Q 10/087 700/236 |
| 2009/0163137 A1* | 6/2009 | Capparelli | H04H 60/06 455/3.06 |
| 2009/0198749 A1* | 8/2009 | Barzilai | G06F 11/1448 |
| 2012/0031984 A1* | 2/2012 | Feldmeier | F24F 11/001 236/49.3 |
| 2012/0033612 A1* | 2/2012 | Jazra | H04L 47/14 370/328 |
| 2013/0271463 A1* | 10/2013 | Curington | G06T 9/001 345/420 |

* cited by examiner

*Primary Examiner* — Chirag R Patel
(74) *Attorney, Agent, or Firm* — Frost Brown Todd, LLC

(57) ABSTRACT

A system and method for reducing the data transmitted from an energy management system is described. The system and method include a critical event evaluator receiving data from a plurality of data sources, where the critical event evaluator monitors the data for critical events requiring immediate transmission to a monitoring center. A schedule comb and a delta comb receive the data from the plurality of data sources, the schedule comb operable to reduce the data according to data schedule rules stored in a data definition database and the delta comb reduce the data by eliminating data values that have not changed since a previous transmission. The schedule comb and delta comb produce a reduced data set. A queue stores the reduced data set, which is transmitted when the queue reaches a trigger size or a critical event is found.

20 Claims, 6 Drawing Sheets

US 9,952,613 B1

SYSTEM AND METHOD OF DATA REDUCTION FOR CELLULAR M2M TRANSMISSIONS FROM ENERGY MANAGEMENT SYSTEMS

TECHNICAL FIELD

The present disclosure is directed to efficient data transmission and more particularly to methods of reducing data transmissions from energy management systems.

BACKGROUND OF THE INVENTION

As the internet of things becomes more of a reality, each of those "things" will need to communicate with each other and centralized servers. In some instances, the things have a wired connection to the internet making communication straight forward. In other instances, wired connectivity is not practical and the devices must rely upon wireless or cellular connections to connect to the Internet. Particularly with cellular services, the cost of connection can become quite expensive.

Many cellular machine-to-machine (m2m) implementations are available at present that are suitable for applications which rarely upload data, such as premises fire/burglar alarm systems, or automobile trouble alert systems. Such applications are purely event-driven by actions that rarely occur, and so can take advantage of low-data-usage cellular plans that make cloud-based monitoring services very affordable for the consumer.

Other applications, such as Energy Management Systems (EMS), however, poise a unique challenge for cellular m2m communication in that heating, ventilation and air conditioning (HVAC) or refrigeration equipment, temperature sensors, and energy usage sensors provide constantly changing data that must be collected on the order of a sample-per-minute from every data source. It is the nature of an EMS to collect "performance vs. time" data for subsequent post-analysis of complex inter-relations that can identify poorly performing equipment in need of maintenance, or even poor control settings by operators.

With the use of standard data-compression algorithms, data generation, for even a modestly sized facility, can exceed 100 MB/month and would require currently unaffordable cellular data plans for the monitoring service market. Even so, standard data-compression is only efficient when used on rather large blocks of data that may represent several hours worth of data collection; a limitation that ignores the "timeliness" requirement that some EMS data, such as a refrigeration unit failure to maintain temperature or a freezer door left open by an employee, needs immediate attention. What is needed is a system and method that can allow for the transmission of large data blocks to maximize compression effectiveness while still allowing for real time event management.

BRIEF SUMMARY OF THE INVENTION

In a preferred embodiment, a system for transmitting data from an energy management system is described. The system includes a critical event evaluator that receives data from a plurality of data sources and monitors the data for critical events requiring immediate transmission to a monitoring center. A comb filter receives the data from the plurality of data sources and producing a reduced data set according to a set of filtering rules. A queue stores the reduced data set from the comb filter, and a packager receives the reduced data set and sends the data set to the monitoring center in response to a trigger, where the queue generates the trigger when the queue reaches a trigger size or maximum posting interval, and wherein the critical event evaluator generates the trigger if a critical event is found. The packager also operates to compress the formatted data before transmission.

In another preferred embodiment a method for reducing transmitted data from an energy management system is described. The method includes monitoring data from a plurality of data sources for critical events requiring immediate transmission to a monitoring center. The data from the plurality of data sources is filtered using a schedule comb and a delta comb, where the schedule comb reduces the data according to data schedule rules stored in a data definition database and the delta comb reduces the data by eliminating data values that have not changed since a previous transmission. The schedule comb and delta comb produce a reduced data set. The reduced data set is then formatted into a formatted data set. The formatted data set is stored in a queue and until a trigger to send the formatted data set is received. The queue generates the trigger when the queue reaches a trigger size or maximum posting interval, and wherein the critical event evaluator generates the trigger if a critical event is found. The formatted data is then compressed for transmission, and transmitted to the monitoring center.

In yet another preferred embodiment, a system for transmitting data from an energy management system is described that includes a critical event evaluator receiving data from a plurality of data sources. The critical event evaluator monitors the data for critical events requiring immediate transmission to a monitoring center. A schedule comb and a delta comb receive the data from the plurality of data sources, the schedule comb reducing the data according to data schedule rules stored in a data definition database and the delta comb reducing the data by eliminating data values that have not changed since a previous transmission. The schedule comb and delta comb produce a reduced data set. A data encoder formats the reduced data set into a formatted data set and sends the formatted data to a queue for storing. A packager listens for a trigger to transmit the formatted data set where the queue generates the trigger when the queue reaches a trigger size or maximum posting interval, and wherein the critical event evaluator generates the trigger if a critical event is found. The packager also compresses the formatted data for transmission.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Typical premise energy management systems (EMS) comprise a number of sensors and controllers that measure the current state of HVAC, refrigeration, and power systems and also measure environmental conditions. This data is collected and can then be analyzed to improve efficiency or to find faulty or damaged equipment and real time disruptions or other problems. The more data collected, the more informative and efficient the EMS can be in identifying trends and problems.

Figure 1:
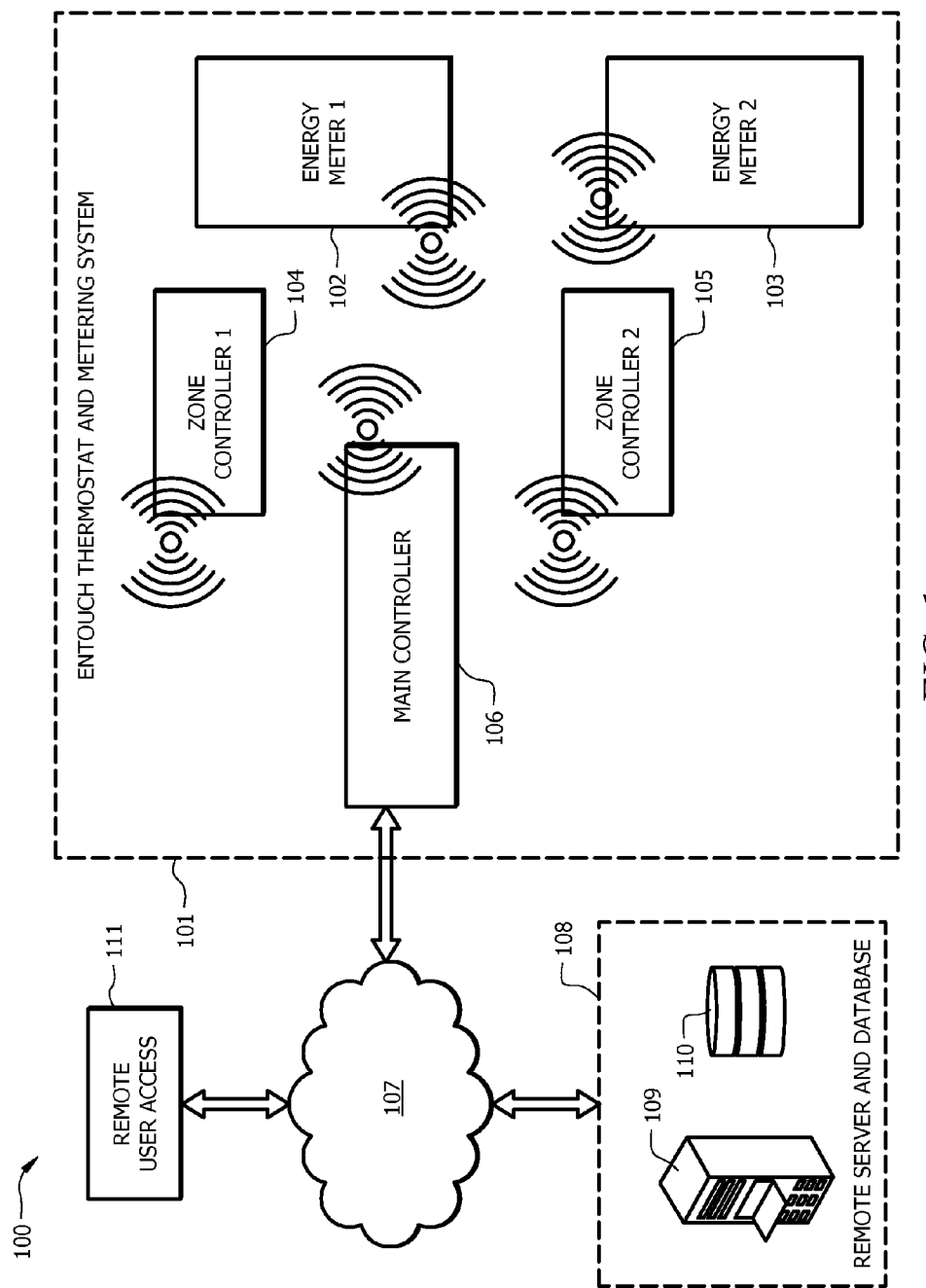
FIG. 1 is a block diagram of an embodiment of a energy management system.

Referring now to FIG. 1, a preferred embodiment of an EMS is shown. System 100 acts both to control the HVAC system in premises 101 and to monitor, meter, analyze and report on the energy usage at premises 101. Energy meters 102 and 103 are installed preferably at a main breaker panel, but can also be installed in sub-panels and distribution panels.

The energy meters 102 and 103 record raw measurements of electrical usage and transmit that data to a local controller, which can be either a zone controller, such as zone controller 104 or zone controller 105 or to a main controller 106. In preferred embodiments, the energy meters use current transformers (CTs) to measure the current in the monitored lines. The current is preferably measured on the main electrical inputs to the breaker panel and on all or any selected branch or load lines leaving the panel.

As described, energy meters 102 and 103 send the collected data to a thermostat/controller. While the data can be sent using hard wired connection without departing from the scope of the invention described herein, in preferred embodiments wireless protocols can also be used to transmit the data, eliminating the need to run wires between devices or use other forms of wired communications. Any appropriate wireless protocol capable of maintaining a reliable connection may be used.

In a house or building that is small enough for a single thermostat, a single controller, such as main controller 106, can be used without losing any functionality. In larger buildings, however, multiple zones may be used to provide better control over the HVAC system. In buildings using multiple zones, each zone can be equipped with its own intelligent controller, shown here as zone controller 104 and zone controller 105, according to the concepts described herein. Each of those zone controllers can then be programmed to report to a main controller 106 which serves as a primary collection and communication hub to communicate with the external server 109 and database 110 of system 100.

Main controller 106 communicates with a remote monitoring center 108 which houses external server 109 and database 110 over network 107, which can be the Internet or any combination of private or public networks. System 100 may include more than one remote monitoring center. Remote monitoring center 108 is operable to collect, analyze, and provide access to the information received from main controller 106 and to allow the reprogramming of any or all of the main controller or zone controllers at premises 101. Database 110 is used to store both the raw data from the premises controllers as well as any process data, configuration information, or other information relevant to system 100. External server is used to process the data and to provide a portal for remote access into the data or an access point to remote control the premises controllers.

Remote user access 111 allows owners or managers of premises 101 to access and analyze the data collected from premises 101 using external server 109 and database 110. Users can look at past data, real time data, reports and analyses generated from the data and can also adjust operating parameters of the controllers and the system configurations such as scaling factors used to interpret the data collected by the energy meter 102 and 103. Remote monitoring center 108 can be in contact with any number of premises and remote user access 111 can access data and update operating configurations for any number of premises under the user's control.

Figure 2:
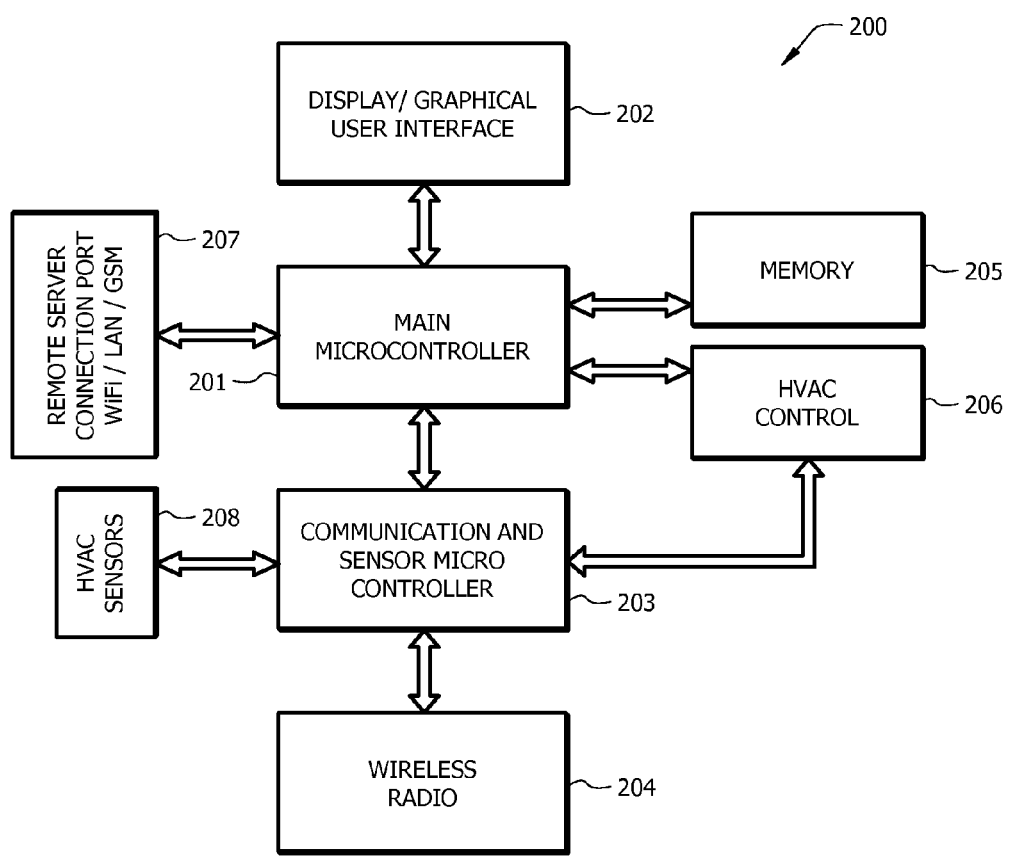
FIG. 2 is a block diagram of an embodiment of a controller in the energy management system.

Referring now to FIG. 2, an embodiment of a controller, such as main controller 106 or zone controllers 104 or 105 is shown. Controller 200 includes main microcontroller 201, which is operable to execute the programming of controller 200. Main microcontroller 201 may include on board memory to store configuration and programming information or may use some portion of memory 105. Main microcontroller 201 controls the display and graphical user interface 202, through which users may directly interact with the controller to view current status or to change the programming or configuration information. Main microcontroller 201 also controls the remote access port 207, which provides for communications with external networks such as WiFi, LAN, or GSM networks.

Communication and sensor microcontroller 203 is also in communication with main microcontroller 201 and provides the interface between the main microcontroller 201 and any remote HVAC sensors 208. Communication and sensor microcontroller 203 also interfaces with the wireless radio 204 that communicates with the energy meters in the distribution or breaker panel. Communication and sensor microcontroller 203 and main microcontroller 201 also interface with the HVAC controller 206, which is used to control the HVAC system hardware.

In many instances the communications link between the EMS 101 and the remote monitoring center 108 shown in FIG. 1 will include a cellular data link as the primary mode of communication or may use a cellular data link as a secondary communications path. The EMS, to function as designed, requires that a large amount of data be transferred and using a cellular data link, while providing many advantages, can result in large data charges to the operator of the EMS.

Figure 3:
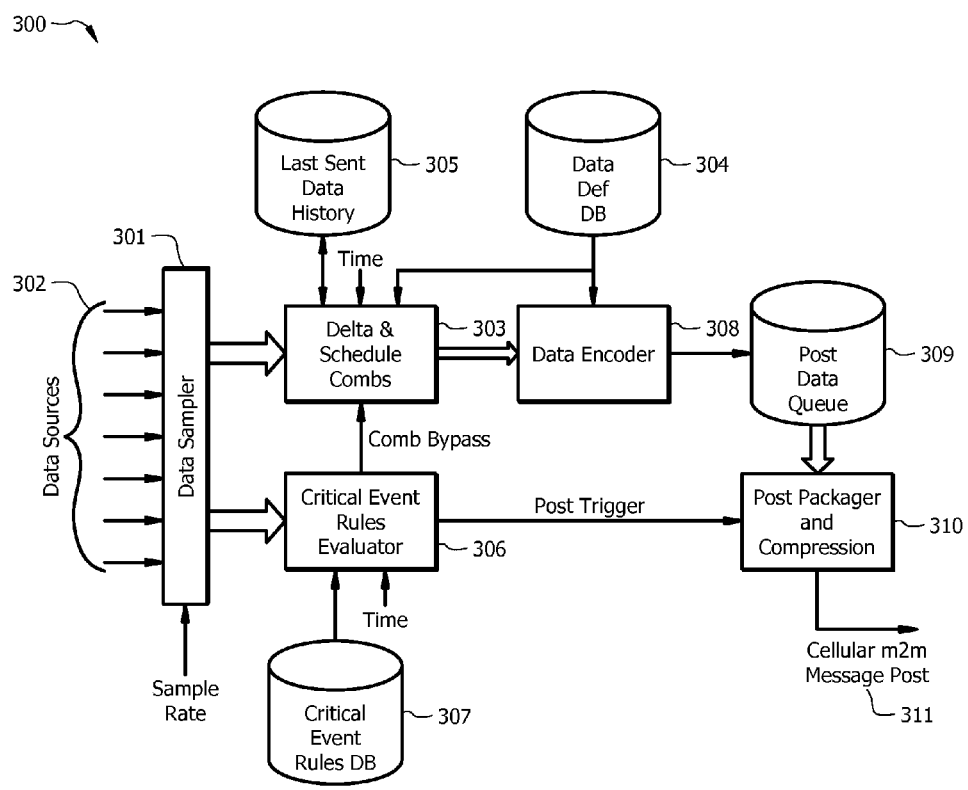
FIG. 3 is a block diagram of an embodiment of a data filtering and encoding systems according to the concepts described herein.

Referring now to FIG. 3, a preferred embodiment of a system and method that provides for a data transmission mechanism 300 across cellular m2m links 311 and that minimizes transfer size to affordable levels, and yet meets EMS requirements of a high degree of time-resolution of collected data, responsive to alert conditions, effective for large to small client facilities, and is easily adaptable to new or changing data sources is shown. Data transfer system 300 receives data from numerous data sources 302 that the EMS controller samples at a pre-determined interval, such as once per minute, but in any event, at a rate often enough as to be responsive to any critical conditions that need to be evaluated. Data sampler 301 passes each set of sampled data to delta and schedule combs 303, which applies delta processing, scheduling, and critical event rules to sampled data. The data is also passed from sampler 301 to critical event rules evaluator 306, which works with critical event database 307. Critical rules database 307 provides rules for how certain data criteria, inter-relations, and time lines satisfy critical events that trigger immediate data transmission. These rules are applied by evaluator 306 to the data stream and in the event that a rule is triggered, a trigger notification is generated that results in immediate data transfer, as will be discussed in greater detail below.

Returning now to delta and schedule combs 303, and as will be described in greater detail below, a data definition database 304 provides rules for each source as to sampling schedule, whether delta processing applies, what critical alert rule applies, and how it is to be encoded. A last sent data history database 305 maintains a log of data transmission to allow system 300 to know which data has been transmitted and when. Data encoder 308 provides a flexible data encoding function for data that passes the data comb criteria. Post data queue 309 accumulates encoded data into a nominally compressible block. A post packager 310 considers data block size, time, and critical events in determining when and how much data to send. Post packager 310 then compresses the block with standard data compression, and sends it over the cellular m2m link 311.

Figure 4:
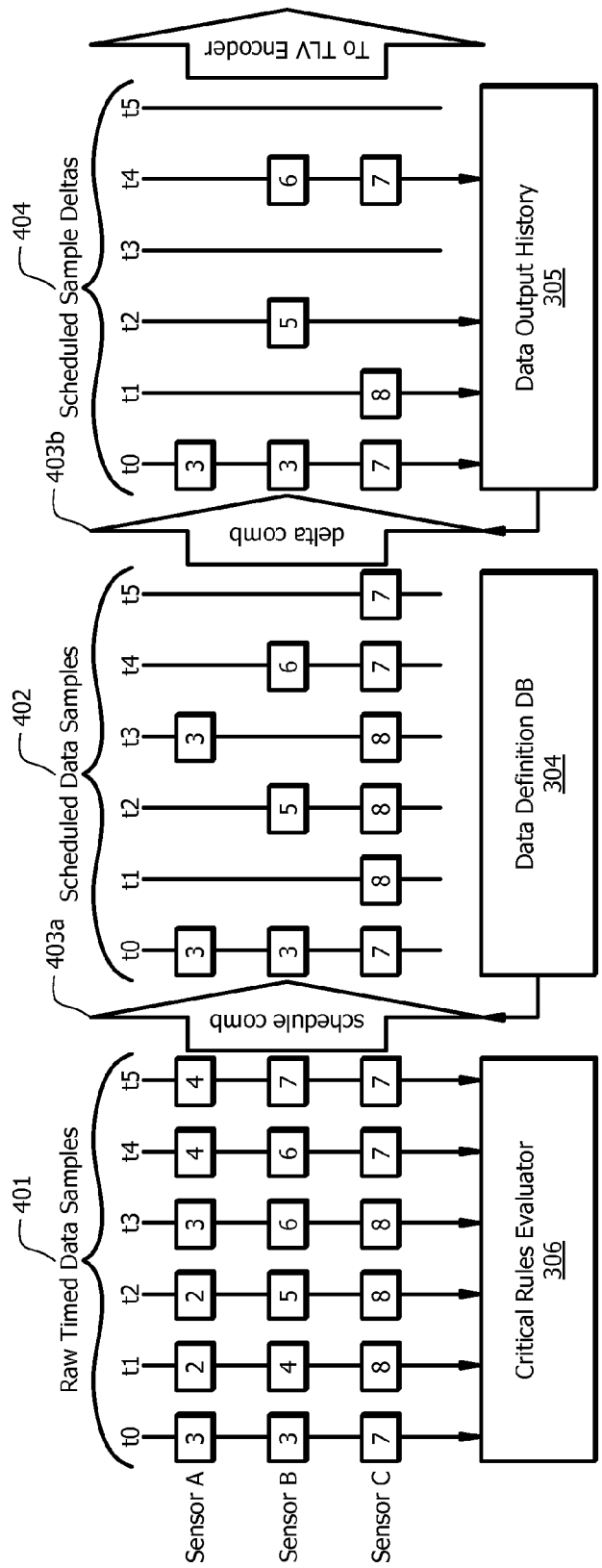
FIG. 4 is a data flow diagram showing an embodiment of a data flow according to the concepts described herein.

Referring now to FIG. 4 in combination with FIG. 3, an embodiment of delta and schedule combs 303 is described in more detail. Raw timed data samples 401 are received from any number of sensors in the EMS system. The sensor data, from sensor A, sensor B, sensor C, etc. are sampled at various time intervals, t0, t1, t2, etc. Critical events evaluator 306 looks for events that would trigger immediate transmission. Schedule comb 403a, as part of delta and schedule combs 303, acts to effectively down-sample some data sources; i.e., to automatically discard all but every 3rd, 5th, or other sample interval as defined in the data definition database 304. Each data source and data item can be individually scheduled according to a data definition store, as shown by scheduled data samples 402 in FIG. 4. Additionally, delta comb 403b acts with data output history database 305, to analyze and discard any sampled data item that has not changed from the value previously sent over the cellular m2m network, as shown by scheduled sample deltas 404. This function works by comparing the current sample value with that in local data store/last sent data history database 305.

Another feature that can be included schedule comb 403a is to have the comb work off of two or more independent schedule definitions; i.e. one for "occupied" times of day, and another for "vacant" times of day, again as defined by the data definition store 304. This feature can take advantage of the fact that many EMS measurement requirements are considerably less demanding when a building is unoccupied, and so less data samples are needed. In preferred embodiments, the two combs, schedule comb 403a and delta comb 403b, work together, such that any data item to be included in the transmitted set must be both different from the last sent value (delta comb pass), and scheduled to be sampled (schedule comb pass). Any data item that passes the data combs then updates the local data store 305 used by the delta comb 403b.

As shown in FIG. 3, critical event evaluator 306 operates independently or in parallel with the data combs. All sample sets of data are analyzed by critical event calculator 306 such that the critical event evaluator examines every sample set, unaltered by the data combs. If a critical event is triggered, then it directs the data combs 303 to allow all data associated with the event to immediately pass through to be encoded.

As described, FIG. 4 is a preferred embodiment of how an embodiment of the data combs could operate. FIG. 4 shows 3 data sources that are sampled at a pre-determined interval, where the values of the sensor outputs at each sample are shown as the numbers inside each box. Although the actual combing process is continuous and in real-time, 6 samples are shown as indicated by times t0 through t5. All sources at every time sample are available to be evaluated by the critical rules engine 306. Here, the data definition database 304 has defined Sensor A to be scheduled for potential encoding every 3rd sample, Sensor B every 2nd sample, and Sensor C on every sample. This schedule comb 403a with its scheduling algorithm produces the scheduled data samples set shown as data set 402. From there, the delta comb 403b examines this set and compares it to the data output history database and only passes sample elements that differ from that history as shown by data set 404. Elements that are passed are used to update the data output history 305. This scheduled sample deltas set 404 shown on the right side of the figure, which is what is given to data encoder 309, which can be a TLV (tag/length/value) encoder.

In the embodiment of FIG. 4, delta comb 403b is shown as passing all samples at time t0. This would normally only be true if the data output history database truly had no prior history stored from a data source. The system can distinguish "no history" from some arbitrary initialization value, such as zero, which may be a valid sample value for some sources of data. The "no history" condition would naturally be true upon initial startup of the device, but may also periodically be forced by the system in some embodiments (typically once per day). Since the EMS units are only sending data that has changed, this makes an implicit assumption that the upstream network "remembers" data values that have not changed, for monitoring purposes. This periodic purging of the data output history allows the upstream servers to resync to these values in the event of some anomaly.

The data definition store 304 also defines how each data item is to be encoded, and the overall structure of that encoding. An embodiment of a sample encoding is shown with reference to FIG. 5. In practice, all of the data shown is sent as a contiguous block from top-to-bottom, left-to-right, whereas the indentations of FIG. 5 simply accentuate the inherent structure of the encoding. The encoding described herein generally follows a tag/length/value structure or TLV encoding as is known in the art. Within data communication protocols, optional information may be encoded as a type-length-value or TLV element inside a protocol. The type and length are fixed in size (typically 1-4 bytes), and the value field is of variable size. The type field is a binary code, often simply alphanumeric, which indicates the kind of field that this part of the message represents. The length field indicates the size of the value field (typically in bytes). The value field is the variable-sized series of bytes which contains data for this part of the message. TLV representation allows TLV sequences to be easily searched using generalized parsing functions. Additionally, new message elements which are received at an older node can be safely skipped and the rest of the message can be parsed. This is similar to the way that unknown XML tags can be safely skipped. TLV elements can be placed in any order inside the message body and are typically used in a binary format which makes parsing faster and the data smaller. Further, it is easier to generate XML from TLV to make human inspection of the data possible.

A header 501 gives information on the entire transmission and a sequence number for the data. The structure 500 then has every data item associated with a particular command ID, and a group of commands 502a, 502b, 502c along with their associated data values 503a, 503b, 503c make up a particular post. The encoding must preserve, as efficiently as possible, the time that the data was collected, what monitoring device collected it, and the identity & boundary of the data within the block. The modified version of the TLV encoding scheme shown in FIG. 5 uses a 1-byte tag to define "what", followed by a 1-byte length, then followed by length-bytes of value data. Embodiments of the modified TLV encoding described according to the concepts shown herein provide several advantages.

The CMD and POST TLV tags preferably use high-order byte values that no data tag uses, so that they can always be recognized within a data stream, even if the meaning of a new CMD or POST tag is not known at some point in the network. This allows for disparate software versions to interoperate, where known parts of a post can be processed while safely ignoring unknown parts in older software. Next, the individual tagging of data fields makes it possible to send only the subset of all possible data fields defined for a command that have passed the combing filtering above.

Due to the structure above, the meaning of any data tag is local within a given command ID, which can effectively provide over 60,000 unique command-data tag combinations even though the average tagging overhead is only slightly above 1 byte. Commands and their data are preferably sent in ascending timestamp order. Commands with the same timestamp as the previous command do not require a command header with a timestamp, thus allowing a shorter command header. These command header variants are denoted by unique command header tags; e.g. CMD1 vs. CMD2 above. Finally, each command, logically, is preferably associated with a sequence number for purposes of receipt acknowledgement by the receiver. The POST header allows only the initial sequence number of the set to be sent, representing that of the first command in the post. All other commands in the set are implicitly "plus one" sequence for each command. Again, this allows less data to be sent across the m2m carrier.

Figure 6:
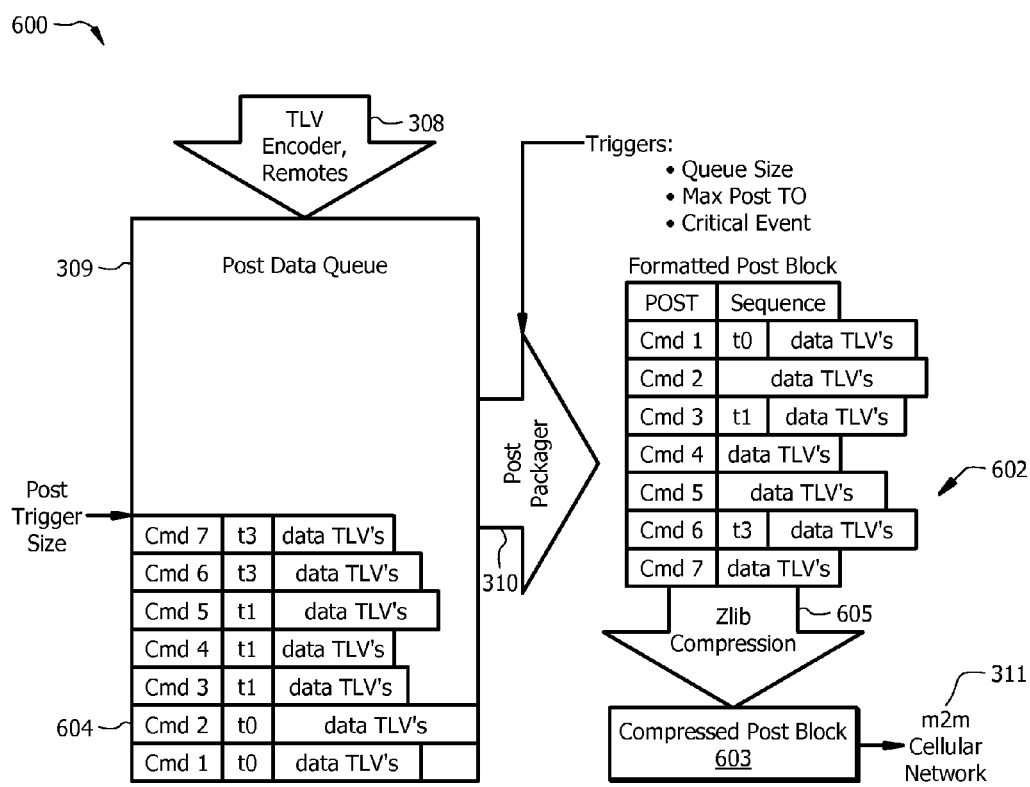
FIG. 6 is a block diagram of an embodiment of a data queue and packaging scheme according to the concepts described herein.

FIG. 6, with reference to FIG. 3, illustrates a preferred embodiment of how the Data TLV encoder 308 can deposit encoded commands 604 into the post data queue 309, where they wait until a triggering event causes the post packager 310 to pull some or all of the encoded commands 604 in the queue for final formatting and compression. In preferred embodiments, the queue has a size threshold, given by the total number of bytes of data queued and called the post trigger size, that could be one of the trigger events that cause the post packager 310 to act. The purpose of accumulating, and thus delaying, transmission of the data is for performance reasons of the compression step 605 shown. In preferred embodiments Zlib compression is used but any compression technique is well within the scope of the concepts described herein. Small blocks of data are inherently less compressible than larger blocks of data. So the purpose of accumulating a larger block to transmit is so that compression is enhanced, and so the m2m cellular network carries less overall traffic.

The data messages 604 are preferably stored in the post data queue 309 in timestamp order. When data comes from the local data comb 303 and TLV encoder 308, this can be the natural order that they are put into the queue. In practice, an EMS controller with GSM access may engage other controllers or devices via a local area wireless network (such as enhanced Zigby or MIWI), which may upload blocks of pre-encoded data to the GSM controller for wide-area network uploading. This remote data must also be folded into the post data queue 309 in overall timestamp order, in order for the post packager 310 to be most efficient.

Figure 5:
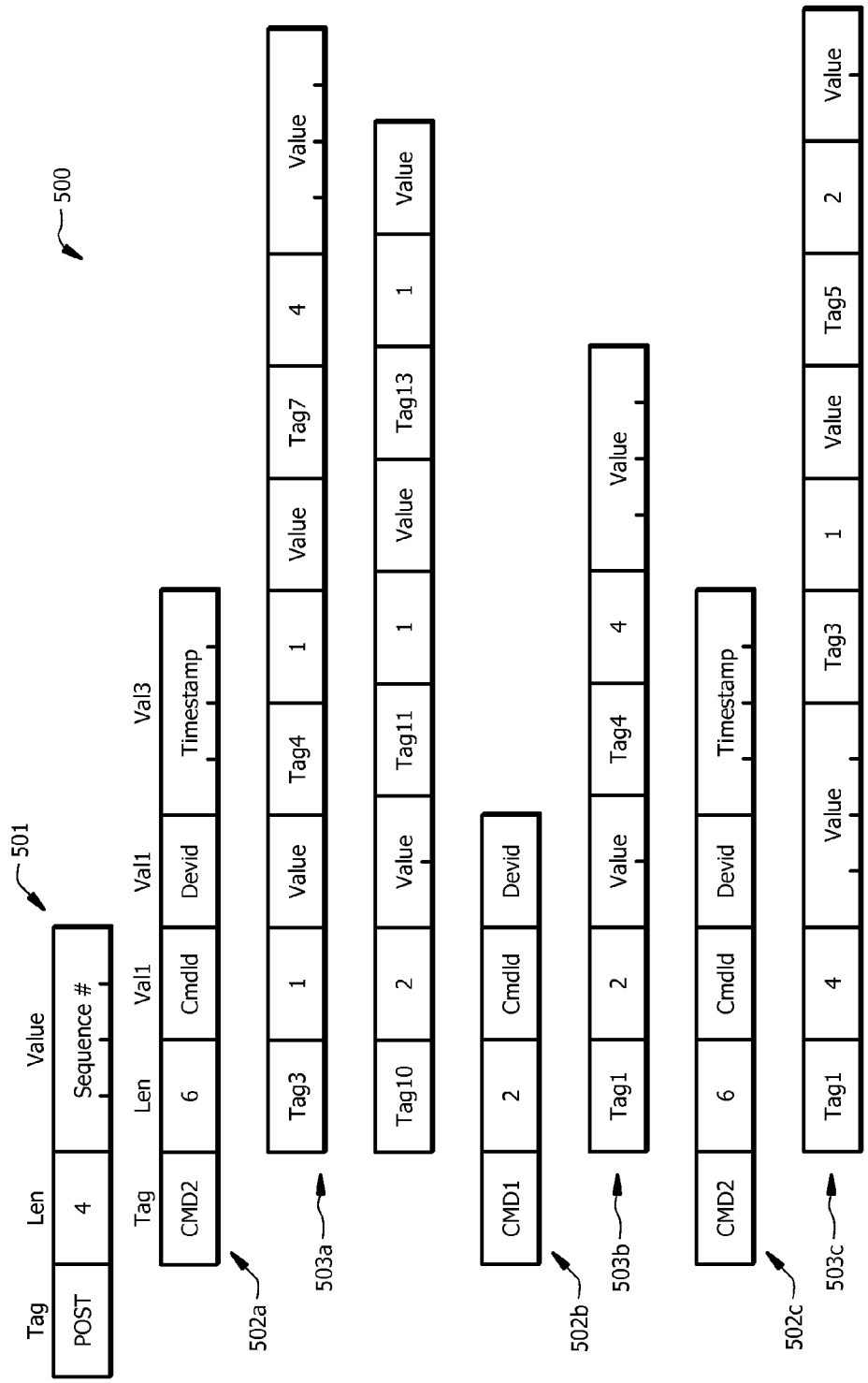
FIG. 5 is an example of a data format according to the concepts described herein.

The post packager 310 encodes the command ID and timestamp from the data queue into the appropriate TLV command header, as shown in FIG. 5 (i.e., whether a header with or without a timestamp is needed). All commands with the same timestamp only require a single command header that contains that timestamp. Finally, a Post TLV header is added at the front end, containing the initial sequence number of all contained commands. The entire block 602 is then compressed using a standard compression algorithm 605 into a compressed post block 603, and queued to be transmitted over the cellular m2m 311 network to the monitoring service.

Other triggers may also cause the post packager 310 to produce an output before the size threshold is reached in the data queue 309. One trigger would be if the critical event rules evaluator 306 signaled a critical condition had been met. In this case a smaller than optimal output would be produced, but in practice these events occur rarely enough as to have negligible impact on monthly cellular data usage. Another trigger is a maximum post interval timeout, which for EMS systems can be set for any time, for example 1 hour in preferred embodiments. This allows the remote monitoring service to set some predictable time limit, if the EMS controller has not been heard from, as to detect that the controller is actually offline and in need of a service action. Smaller installations, or sites that are experiencing a stable energy-usage environment, may naturally produce less data than more complex or dynamic sites, and thus need this time limit.

An advantage of the present invention is that the larger and more complex the EMS installation needs are, the more efficient and effective the data compression method described herein becomes. A typical EMS controller will have about 560 different data tags defined for about 35 command messages. Before the system and method described herein, a single stand-alone controller might send about 120 MB of data per month to the monitoring service. This system and method of the present invention has been shown to reduce the transmission rate to about 1 MB of data per month. A larger installation with 8 slave controllers and 4 power measurement modules, all funneling their data through the GSM controller, raises the data usage to about 3.2 MB of data per month. This represents an efficiency gain of about 3:1 for large installations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for transmitting data from an energy management system, the system for transmitting comprising:
   a microcontroller communicatively coupled to a plurality of data sources and comprising;
   a critical event evaluator receiving data from the plurality of data sources, the critical event evaluator monitoring the data for critical events requiring immediate transmission to a monitoring center;
   a comb filter receiving the data from the plurality of data sources and producing a reduced data set according to a set of filtering rules;
   a queue for storing the reduced data set from the comb filter; and
   a packager operable to receive a trigger to send the reduced data set, the packager also operable to compress the reduced data for transmission, wherein the queue is configured to generate the trigger when the queue reaches a trigger size and also when the queue reaches a maximum post interval, and wherein the critical event evaluator generates the trigger if a critical event is found.

2. The system of claim 1 wherein the comb filter comprises a schedule comb and a delta comb receiving the data from the plurality of data sources, the schedule comb reducing the data according to data schedule rules stored in a data definition database and the delta comb reducing the data by eliminating data values that have not changed since a previous transmission, the schedule comb and delta comb producing a reduced data set.

3. The system of claim 1 wherein a critical event includes detection of a failure of equipment in the energy management system.

4. The system of claim 1 wherein the data sources are sensors and controllers in a heating, ventilation and air conditioning system monitored by the energy management system.

5. The system of claim 1 further comprising a data encoder operable to format the reduced data set into a formatted data set.

6. The system of claim 5 wherein data encoder uses a tag-length value encoding system to produce the formatted data set.

7. The system of claim 1 wherein the packager compresses the reduced data set using a Zlib compression technique.

8. A method for reducing transmitted data from an energy management system, the method comprising:
   monitoring data from a plurality of data sources for critical events requiring immediate transmission to a monitoring center;
   filtering the data from the plurality of data sources using a schedule comb and a delta comb, wherein the schedule comb reduces the data according to data schedule rules stored in a data definition database and the delta comb reduces the data by eliminating data values that have not changed since a previous transmission, the schedule comb and delta comb producing a reduced data set;
   formatting the reduced data set into a formatted data set using a data encoder;
   storing the formatted data set from the data encoder;
   receiving a trigger to send the formatted data set, wherein the queue generates the trigger when the queue reaches a trigger size and wherein the critical event evaluator generates the trigger if a critical event is found;
   compressing the formatted data for transmission; and
   transmitting the compressed data to the monitoring center.

9. The method of claim 8 wherein the data sources are sensors and controllers in a heating, ventilation and air conditioning system monitored by the energy management system.

10. The method of claim 8 further comprising a data encoder operable to format the reduced data set into a formatted data set.

11. The method of claim 8 wherein data encoder uses a tag-length value encoding system to produce the formatted data set.

12. The method of claim 8 wherein the packager compresses the reduced data set using a Zlib compression technique.

13. The method of claim 8 wherein a critical event includes detection of a failure of equipment in the energy management system.

14. A system for transmitting data from an energy management system, the system for transmitting comprising:
   a microcontroller communicatively coupled to a plurality of data sources and comprising;
   a critical event evaluator receiving data from the plurality of data sources, the critical event evaluator monitoring the data for critical events requiring immediate transmission to a monitoring center;
   a schedule comb and a delta comb receiving the data from the plurality of data sources, the schedule comb reducing the data according to data schedule rules stored in a data definition database and the delta comb reducing the data by eliminating data values that have not changed since a previous transmission, the schedule comb and delta comb producing a reduced data set;
   a data encoder operable to format the reduced data set into a formatted data set;
   a queue for storing the formatted data set from the data encoder; and
   a packager operable to receive a trigger to send the formatted data set, the packager also operable to compress the formatted data for transmission, wherein the queue generates the trigger when the queue reaches a trigger size and wherein the critical event evaluator generates the trigger if a critical event is found.

15. The system of claim 14 wherein the data sources are sensors and controllers in a heating, ventilation and air conditioning system monitored by the energy management system.

16. The system of claim 14 further comprising a data encoder operable to format the reduced data set into a formatted data set.

17. The system of claim 14 wherein data encoder uses a tag-length value encoding system to produce the formatted data set.

18. The system of claim 14 wherein the packager compresses the reduced data set using a Zlib compression technique.

19. The system of claim 14 wherein a critical event includes detection of a failure of equipment in the energy management system.

20. The system of claim 14 further comprising a data definition database interacting with the schedule comb wherein data sources defined in the data definition database as members of a particular sampling schedule will maintain a time correlation and an alignment of associated data changes when such correlation and alignment exists at the source.

\* \* \* \* \*